US010781332B2

(12) United States Patent
Lim et al.

(10) Patent No.: US 10,781,332 B2
(45) Date of Patent: Sep. 22, 2020

(54) WEAR-RESISTANT AND LOW-FRICTION POLYMER COMPOSITE COMPRISING NANO-DIAMOND POWDER TREATED WITH HYDROGEN PLASMA, AND METHOD FOR PRODUCING POLYMER COMPOSITE

(71) Applicant: KOREA UNIVERSITY RESEARCH AND BUSINESS FOUNDATION, Seoul (KR)

(72) Inventors: Dae-Soon Lim, Seoul (KR); Eung-seok Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 140 days.

(21) Appl. No.: 16/074,806

(22) PCT Filed: Feb. 3, 2017

(86) PCT No.: PCT/KR2017/001177
§ 371 (c)(1),
(2) Date: Aug. 2, 2018

(87) PCT Pub. No.: WO2017/135724
PCT Pub. Date: Aug. 10, 2017

(65) Prior Publication Data
US 2019/0055423 A1 Feb. 21, 2019

(30) Foreign Application Priority Data
Feb. 4, 2016 (KR) .................. 10-2016-0013853

(51) Int. Cl.
*C09D 127/18* (2006.01)
*B01J 19/08* (2006.01)
(Continued)

(52) U.S. Cl.
CPC ............ *C09D 127/18* (2013.01); *B01J 19/08* (2013.01); *B01J 19/088* (2013.01); *C01B 32/28* (2017.08);
(Continued)

(58) Field of Classification Search
None
See application file for complete search history.

(56) References Cited

U.S. PATENT DOCUMENTS 9,512,302 B2* 12/2016 Myllymaki .............. C08K 5/01
10,224,867 B2* 3/2019 Bertelo ............... H01L 31/0488
(Continued)

FOREIGN PATENT DOCUMENTS

KR 10-2008-0093625 A 10/2008
KR 10-2010-0103242 A 9/2010
(Continued)

OTHER PUBLICATIONS

Arnault, Jean-Charles, et al., "Surface chemical modifications and surface reactivity of nanodiamonds hydrogenated by CVD plasma", *Physical Chemistry Chemical Physics*, Jun. 28, 2011, pp. 11453-11776, vol. 13, Issue 24 (8 pages in English).
(Continued)

*Primary Examiner* — Satya B Sastri
(74) *Attorney, Agent, or Firm* — NSIP Law

(57) ABSTRACT

Provided are a polytetrafluoroethylene (PTFE) coating and a preparing method of the same. The PTFE coating includes: a nanodiamond powder whose surface is treated with a plasma using a hydrogen-containing reactive gas to remove amorphous carbon, the nanodiamond powder being ground in a commercially available state and having a surface to which a functional group is attached; and a PTFE solution dispersing the nanodiamond powder.

11 Claims, 12 Drawing Sheets

(51) Int. Cl.
  *C09D 7/62*   (2018.01)
  *C01B 32/28*  (2017.01)
  *C09D 7/40*   (2018.01)
  *C08K 3/04*   (2006.01)
  *C08K 9/04*   (2006.01)

(52) U.S. Cl.
  CPC ............... *C09D 7/62* (2018.01); *C09D 7/68* (2018.01); *B01J 2219/0879* (2013.01); *B01J 2219/0894* (2013.01); *C01P 2004/62* (2013.01); *C08K 3/04* (2013.01); *C08K 9/04* (2013.01); *C08K 2201/011* (2013.01)

(56) References Cited

U.S. PATENT DOCUMENTS

| | | | | |
|---|---|---|---|---|
| 2005/0087759 | A1* | 4/2005 | Bailey, III | H01L 21/32136 257/100 |
| 2010/0233371 | A1* | 9/2010 | Kim | F02F 3/10 427/290 |
| 2015/0010709 | A1* | 1/2015 | Beckford | B05D 7/54 427/385.5 |
| 2018/0179068 | A1* | 6/2018 | Liang | C25F 1/00 |

FOREIGN PATENT DOCUMENTS

| | | |
|---|---|---|
| KR | 10-2011-0114631 A | 10/2011 |
| KR | 10-2015-0004664 A | 1/2015 |
| KR | 10-1574318 B1 | 12/2015 |
| WO | WO 2015/042555 A1 | 3/2015 |

OTHER PUBLICATIONS

International Search Report dated May 23, 2017 in corresponding International Application No. PCT/KR2017/001177 (2 pages in English, 2 pages in Korean).

* cited by examiner

WEAR-RESISTANT AND LOW-FRICTION POLYMER COMPOSITE COMPRISING NANO-DIAMOND POWDER TREATED WITH HYDROGEN PLASMA, AND METHOD FOR PRODUCING POLYMER COMPOSITE

CROSS REFERENCE TO RELATED APPLICATIONS

This application is a U.S. National Stage Application of International Application No. PCT/KR2017/001177 filed on Feb. 3, 2017, which claims priority to Korea Patent Application No. 10-2016-0013853 filed on Feb. 4, 2016, the entireties of which are both hereby incorporated by reference.

TECHNICAL FIELD

The present disclosure relates to a plasma surface treatment method of a nanodiamond powder and a polytetrafluoroethylene (PTFE) coating including a nanodiamond powder treated with a plasma by the plasma surface treatment method.

BACKGROUND

In general, carbon-based nanomaterials have been applied to various fields of application. Among carbon nanomaterials, the most widely used materials are carbon nanotubes such as fullerenes, single-walled, double-walled and multi-walled carbon nanotubes (SWCNT, DWCNT, and MWCNT), carbon nanofibers, and the like. The representative feature of carbon-based nanoparticles is to easily produce surface functional groups such as —$CO_2H$ (carboxylic acid), lactone, C=O (ketocarbonyl), —C—O—C— (ether), and OH (hydroxyl). Accordingly, carbon-based nanoparticles are expanding their application in various fields. In particular, the carbon-based nanoparticles are added as fillers in polymer composites to provide highly improved mechanical properties. Studies have been extensively conducted on automobiles, mechanical components, and aerospace.

Among carbon nanoparticles, nanodiamonds have unique characteristics. For this reason, many research cases applying nanodiamonds have been published in recent years. A nanodiamond is produced under high temperature and high pressure at the explosion of trinitrotoluene (T.N.T) or research department explosive (RDX) that is a white crystalline non-aqueous bomb.

A nanodiamond is a carbon material with a unique structure that surrounds the nuclei of diamond crystals of 1 to 4 nanometers (nm) with amorphous carbon. A nanodiamond is extremely small, with a particle size of 1 to 4 nm, and exhibits wide specific surface area and unique electrical, chemical and optical properties. In particular, nanodiamonds are in the spotlight as reinforcing fillers for polymeric materials because their high mechanical properties are similar to those of diamond (Patent Document 1).

However, carbon nanoparticles are characterized in that they agglomerate due to the strong van der Waals force in a dried state. Similarly, nanodiamond materials have limited use as reinforcing fillers in polymer composites due to their strong cohesion in a dried state. This is because when the agglomerated particles are used as a filler of the polymer composite, a stress is concentrated at an agglomerated portion of the nanoparticles and induces the fracture to result in deterioration of performance of the polymer composite.

To overcome the above-mentioned disadvantages, a technique of dispersing nano diamond particles and polyvinyl pyrrolidone (PVP) to prepare a composite is publicly known. However, there is a problem that excellent characteristics of pure nanodiamond material cannot be used because the material is prepared by a dispersion method using a chemical additive (Patent Document 2).

In the case of a commercially available nanodiamond, the inside of nanodiamond particles is composed of carbon of $SP^3$ bond that is a diamond bond structure while the surface of the nanodiamond particles is stacked with amorphous carbon composed of $SP^2$ bond. When the amorphous carbon is used without being removed, it is difficult to say that the excellent characteristics of the pure nanodiamonds are all used.

In a conventional nanodiamond dispersion method, loss of nanodiamonds may occur due to long-term use of ultrasonic treatment and long-term use of a ball milling and a filtration apparatus. As a result, the process becomes complex, the manufacturing cost increases, and productivity decreases.

A nanodiamond is a micronized diamond crystal of several to several hundreds of nanometers (nm) in size and is widely used for surface hardening, wear-resistant and erosion-resistant coatings for metals, abrasives, and the like.

A nanodiamonds is produced by means of high-temperature high-pressure method, synthesis method using shock wave, chemical vapor deposition (CVD), and detonation. As an example, in the detonation, gunpowder explodes in an inert atmosphere to allow the remaining carbon atoms to grow into diamond crystals with a grain size of 4.3±0.4 nm by incomplete combustion.

Individual particles of commercially available diamond powder exist in the form of agglomerated particles having a diameter of several hundred nanometers (nm) to several micrometers (μm). That is, since a nanodiamond is extremely large in surface area relative to its volume, surface energy of the nanodiamond is so great that the nanodiamond cannot exist as a unit particles each having a size of several nanometers at the time of detonation and the unit particles are aggregated with each other to form a so-called hard aggregate, which makes it difficult to physically separate the unit particles.

For the above reasons, it is not exaggerated to say that the core of a technique utilizing nanodiamond powder is how to grind agglomerated particles and to uniformly disperse the agglomerated particles. Conventionally, a nanodiamond powder is treated with a silane coupling agent after being dispersed in an organic solvent by bead milling. The silane coupling agent, particularly, its inorganic functional group surrounds nanodiamond particles to a dispersed state while keeping a nano size without aggregation of nanodiamond particles.

On the other hand, polytetrafluoroethylene (PTFE) has been used as a coating and lubricant in the industry due to its excellent low friction property. Conventionally, a coating agent prepared by mixing a commercially available PTFE coating solution with a dispersion of silanized nanodiamond powder has been proposed.

Patent Document 1: Korean Patent Publication No. 2008-0093625

Patent Document 2: Korean Patent Publication No. 2012-0114631

Patent Document 3: Korean Patent Publication No. 2010-0103242

SUMMARY

A feature of the present disclosure is to grind a commercially available diamond powder through a plasma treatment, improve dispersability, improve adhesion to a polymer composite which results from preparation of a chemical functional group by using a plasma, and remove amorphous carbon formed on a surface of a commercially available nanodiamond to use excellent characteristics of a pure nanodiamond.

Another feature of the present disclosure is to provide a polymer composite including a plasma-treated nanodiamond which is capable of significantly reducing producing processes of a nanodiamond powder, improving wear-resistant properties, and improving adhesion to a base material and friction characteristics.

Another feature of the present disclosure is to provide a polymer composite coating including a plasma-treated nanodiamond.

Example embodiments of the present disclosure provide a polytetrafluoroethylene (PTFE) coating. The PTFE coating includes: a nanodiamond powder whose surface is treated with a plasma using a hydrogen-containing reactive gas to remove amorphous carbon, the nanodiamond powder being ground in a commercially available state and having a surface to which a functional group is attached; and a PTFE solution dispersing the nanodiamond powder.

In example embodiments, the functional group may be an amino group ($-NH_2$) or a methylene group ($-CH_2$).

In example embodiments, a particle size of a plasma-treated nanodiamond may be between 190 and 220 nanometers (nm).

Example embodiments of the present disclosure provide a preparing method of a polytetrafluoroethylene (PTFE) coating. The preparing method includes: treating a commercially available diamond powder with a plasma using a hydrogen-containing reactive gas to be ground to a nanodiamond powder, remove amorphous carbon on a surface of the plasma-treated nanodiamond powder, and attach a functional group to the surface of the plasma-treated nanodiamond powder; and mixing the plasma-treated nanodiamond with a PTFE solution In example embodiments, the reactive gas may include at least one of a hydrogen gas ($H_2$), a nitrogen gas ($N_2$), and an ammonia gas ($NH_3$).

In example embodiments, a reaction temperature of the nanodiamond may be between 300 and 700 degrees Celsius during the plasma treatment.

In example embodiments, a particle size of the nanodiamond may be between 190 and 220 nanometers (nm).

In example embodiments, the plasma treatment may be performed, in a plasma treatment apparatus which is disposed inside a vacuum container and includes a top electrode and a bottom electrode disposed to face each other, by a capacitively-coupled hydrogen plasma which is generated by RF power which places the carbon fiber bundle at the bottom electrode, heats the bottom electrode, and receives and provides a hydrogen gas to the top electrode.

In example embodiments, a pressure of the vacuum container may be between 50 to 1000 milliTorr (mTorr), the RF power may be between 200 and 1000 watts (W), and a reaction temperature of the bottom electrode may be between 300 and 700 degrees Celsius.

In example embodiments, a size of the commercially available powder may be at the level of 4 micrometers.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
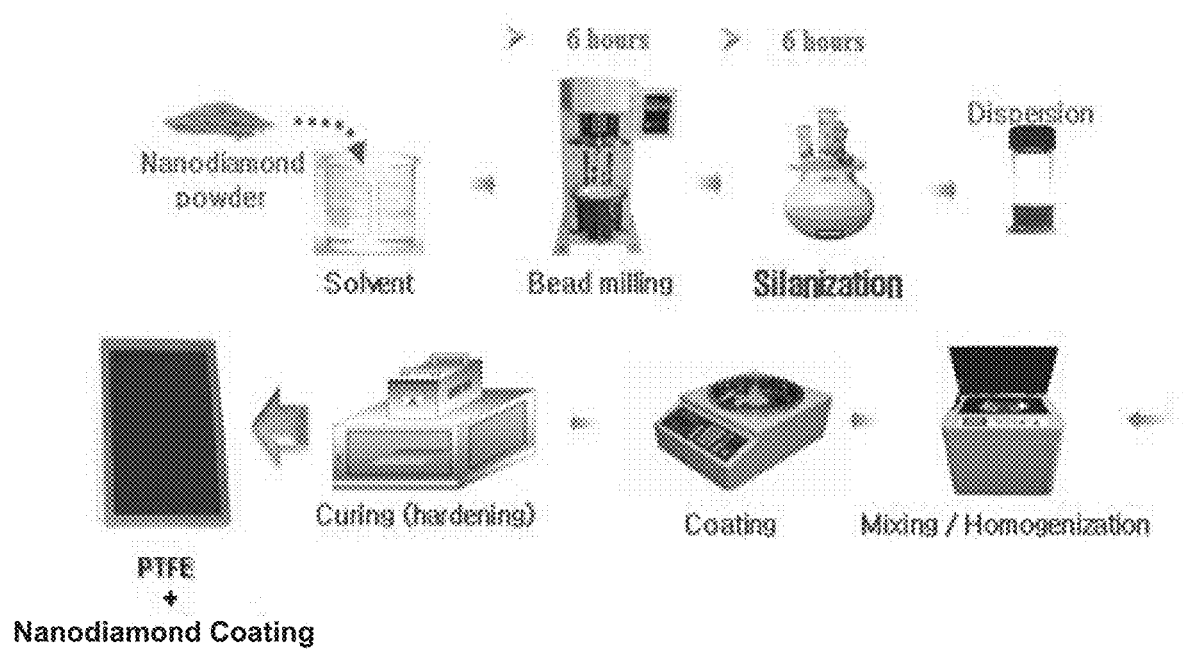
FIG. 1 is a schematic diagram illustrating a conventional producing method of a polymer composite.

According to example embodiments of the present disclosure, a hydrogen plasma treatment may grind hard aggregated nanodiamond particles to make a particle size finer, form a functional group capable of improving a bonding force with a polymer on a nanodiamond surface, and remove an unnecessary residual carbon bond (amorphous carbon) on the nanodiamond surface.

According to example embodiments of the present disclosure, when a commercially available nanodiamond is exposed to hydrogen plasma in a plasma apparatus, the particle size is made finer by particle aggregation elimination achieved by plasma, and a functional group capable of improving a bonding force with a polymer is formed on a nanodiamond surface, and an unnecessary residual carbon bond (amorphous carbon) is removed on the nanodiamond surface.

A hydrogen plasma-treated nanodiamond powder is easily dispersed in a PTFE solution to provide a PTFE coating liquid. A nanodiamond PTFE coating liquid may be coated on a treatment target and cured (hardened) to provide excellent friction characteristics and excellent wear characteristics. The friction characteristics and the wear characteristics are much more excellent under poor test conditions than those of a PTFE coating film using a conventional silanized nanodiamond.

Example embodiments will now be described more fully with reference to the accompanying drawings, in which some example embodiments are shown. Example embodiments may, however, be embodied in many different forms and should not be construed as being limited to the embodiments set forth herein; rather, these example embodiments are provided so that this disclosure will be thorough and complete, and will fully convey the scope of example embodiments of the present disclosure to those of ordinary skill in the art. In the drawings, the thicknesses of layers and regions are exaggerated for clarity. Like reference characters and/or numerals in the drawings denote like elements, and thus their description may be omitted.

FIG. 1 is a schematic diagram illustrating a conventional producing method of a polymer composite.

Referring to FIG. 1, a commercially available diamond powder has a diameter of several micrometers due to hard aggregation and is introduced into an organic solvent such as n-butanol. The commercially available diamond powder is ground into a small size by bead milling. The organic solvent and the commercially available powder are ground into a nanodiamond powder at the level of several hundreds of nanometers by bead milling. The nanodiamond powder is silanized by a coupling agent. The silanized nanodiamond powder is introduced into a coating liquid to be dispersed and treated. The coating liquid including the nanodiamond powder is stirred and is coated on a treatment target by a method such as spin coating.

However, the bead milling process and the silanization process require a lot of time.

Figure 2:
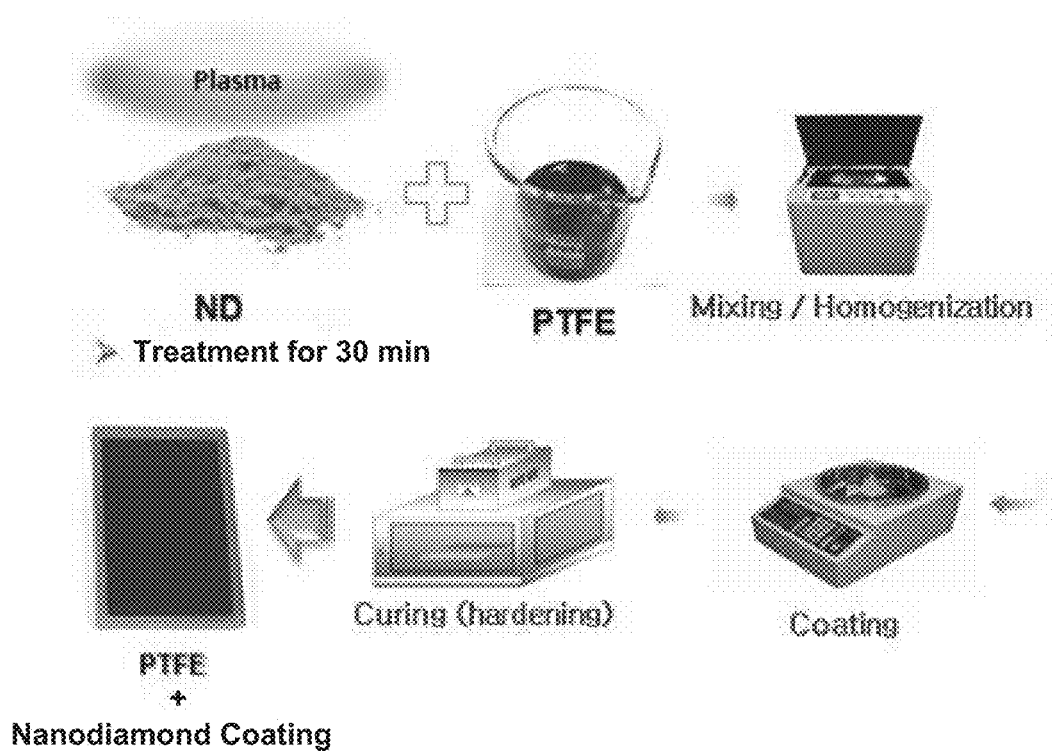
FIG. 2 is a schematic diagram illustrating a preparing method of a polytetrafluoroethylene (PTFE) coating according to an example embodiment of the present disclosure.

FIG. 2 is a schematic diagram illustrating a preparing method of a polytetrafluoroethylene (PTFE) coating according to an example embodiment of the present disclosure.

Referring to FIG. 2, the preparing method of a polytetrafluoroethylene (PTFE) coating includes treating a commercially available diamond powder with a plasma using a hydrogen-containing reactive gas to be ground into a nanodiamond powder, to remove amorphous carbon on its surface, and to attach a functional group and mixing the plasma-treated nanodiamond with a polytetrafluoroethylene (PTFE) solution.

The plasma-treated nanodiamond powder and the PTFE solution are stirred to complete the PTFE coating. The PTFE coating is coated on a treatment target through a method such as spin coating and is cured by thermal curing/ultraviolet curing process.

According to example embodiments of the present disclosure, a bead milling process, a silanization process, and a dispersion process need not be performed, as compared to a conventional method. According to the present disclosure, processes are simplified to reduce the cost and the PTFE coating film exhibits better friction characteristics than a conventional silanized coating film.

Figure 3:
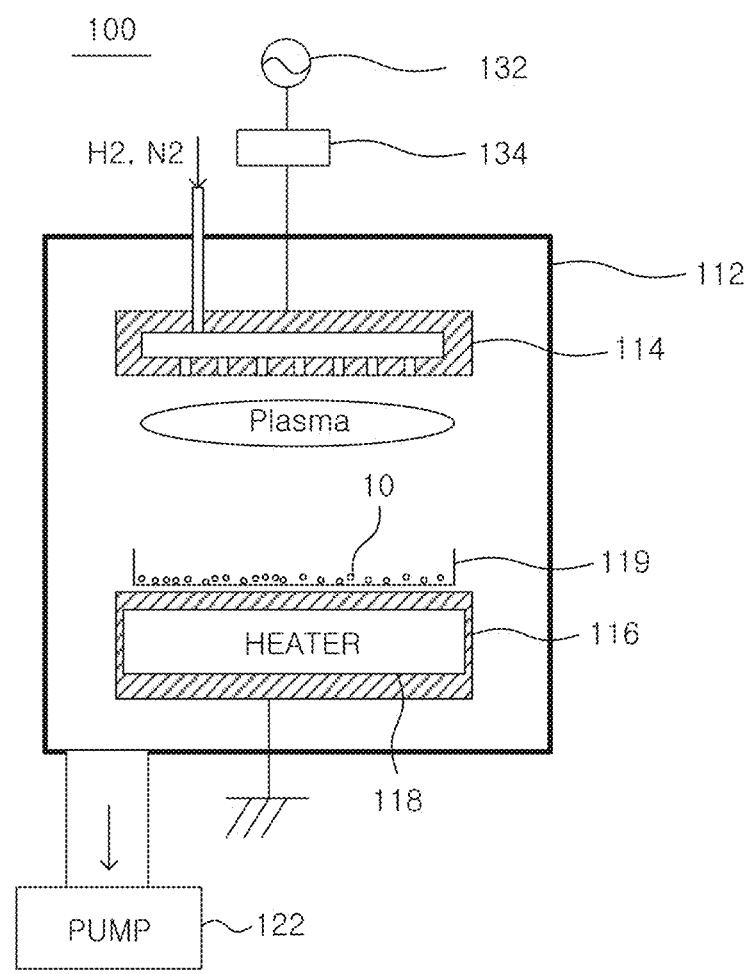
FIG. 3 is a conceptual diagram of a plasma treating apparatus for treating a nanodiamond powder according to an example embodiment of the present disclosure.

FIG. 3 is a conceptual diagram of a plasma treatment apparatus 100 for treating a nanodiamond powder according to an example embodiment of the present disclosure.

Referring to FIG. 3, the plasma treatment apparatus 100 includes a vacuum chamber 112 and a top electrode 114 and a bottom electrode 116 provided inside the vacuum chamber 112 and disposed to face each other. The top electrode 114 is supplied with radio-frequency (RF) power from an RF power supply 132 through a matching network 134. The top electrode 114 may generate a capacitively-coupled plasma. The top electrode 114 may receive a reactive gas from an external entity and distribute and emit the gas. The reactive gas may include at least one of a hydrogen gas, a nitrogen gas, and an ammonia gas. Preferably, the reactive gas may be a hydrogen gas or a mixture gas of hydrogen and nitrogen. A frequency of the RF power may be 13.56 MHz, and the power supplied to the top electrode 114 may be several tens of watts (W) to several kilowatts (kW).

In a process of plasma-treating a commercially diamond powder, besides a reactive gas, an inert gas such as argon may be added to adjust discharge characteristics of the gas or form a functional group.

The bottom electrode 116 may include a heater 118 therein and may be grounded. A ceramic crucible 10 is disposed on the bottom electrode 116. The crucible 119 stores a commercially available diamond powder 10. The crucible 10 is heated by the heater 118. A temperature of the heater 118 or the crucible 119 may be between 300 and 700 degrees Celsius. When the temperature of the crucible 119 is too high, a carbon fiber may be deposited by a contaminant. Preferably, the temperature of the crucible 119 may be between 300 and 400 degrees Celsius. The reactive gas is supplied after the temperature of the crucible 119 reaches a predetermined process temperature. When a pressure is stabilized, RF power is supplied to the top electrode 114 to generate a hydrogen plasma.

Preferable, the reaction temperature is 300 degrees Celsius. Since a sufficient reaction cannot be performed when the reaction temperature is less than 200 degrees Celsius, the reaction temperature is not preferable. When the reaction temperature is higher than 1500 degrees Celsius, a carbon fiber may be physically or chemically changed by the extremely high temperature. Hence, the reaction temperature higher than 1500 degrees Celsius is not preferable.

A plasma treatment time of the commercially available diamond powder may be between several minutes and several hours. The commercially available diamond powder having a length of 4 micrometers was used, but a size of the diamond powder may vary depending on product. When the commercially available diamond powder having a length of 4 millimeters, a size of the plasma-treated nanodiamond powder may be at the level of 190 to 220 nanometers (nm).

Figure 4:
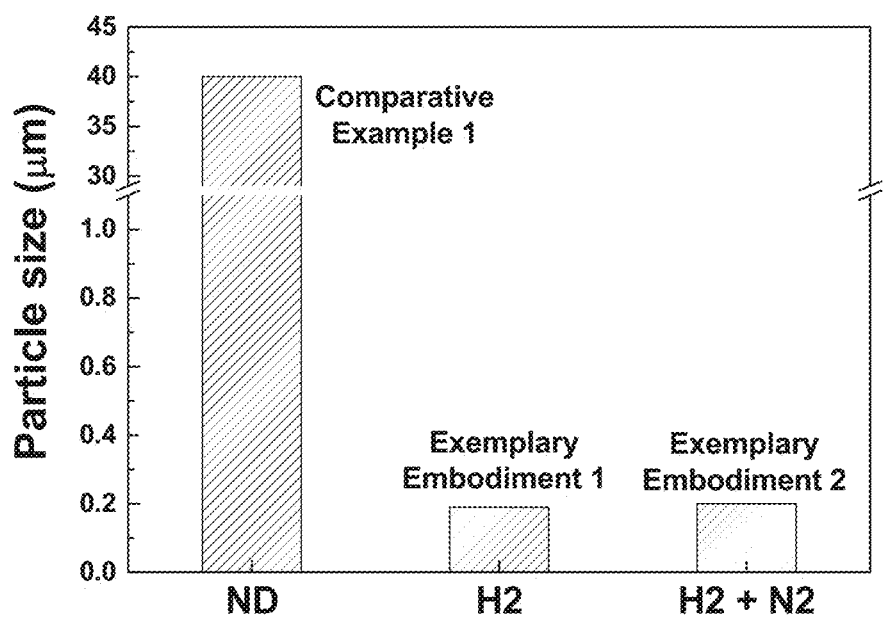
FIG. 4 shows a graph of analyzing a particle-size variation after a plasma treatment depending on a hydrogen gas and a mixture gas of hydrogen and nitrogen according to an example embodiment of the present disclosure.

FIG. 4 shows a graph of analyzing a particle-size variation after a plasma treatment depending on a hydrogen gas and a mixture gas of hydrogen and nitrogen according to an example embodiment of the present disclosure.

Referring to FIG. 4, when a commercially available diamond is analyzed in particle size, a diameter of the commercially available diamond is at the level of 4 micrometers due to hard aggregation (Comparative Example 1).

According to the present disclosure, when the commercially available diamond powder having a diameter of 4 micrometers is exposed to a hydrogen plasma, particles are ground to be reduced in size at the level of about 0.2 micrometer (Exemplary Embodiment 1). In the case of the hydrogen plasma, a reactive gas is a hydrogen gas, a pressure of a vacuum container is 300 milliTorr (mTorr), and a temperature of the bottom electrode 116 or the crucible 119 is 300 degrees Celsius. RF power applied to the top electrode 114 is 450 watts (W). A plasma treatment time is an hour.

On the other hand, when the commercially available diamond powder having a diameter of 4 micrometers is exposed to a mixture gas plasma of hydrogen and nitrogen, a particle is reduced in size at the level of about 0.2 micrometers (Exemplary Embodiment 2). A reactive gas is a mixture gas of hydrogen and nitrogen. A flow rate of hydrogen and nitrogen is one-to-one (1:1). A pressure of the vacuum container is 300 mTorr, and a temperature of the bottom electrode 116 or the crucible 119 is 300 degrees Celsius. RF power applied to the top electrode 114 is 450 W. A plasma treatment time is an hour.

Figure 5:
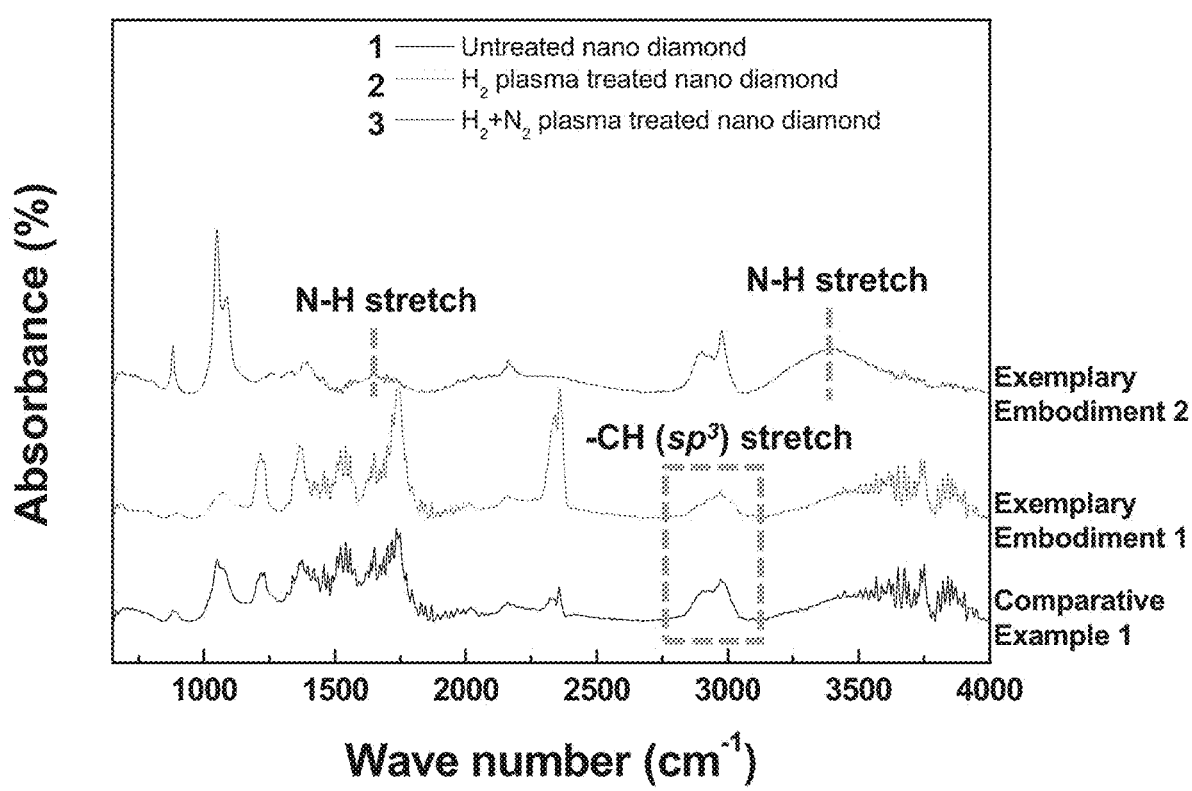
FIG. 5 show an FT-IR analysis result of formation of a functional group by a hydrogen plasma treatment and a hydrogen and nitrogen plasma treatment according to an example embodiment of the present disclosure.

FIG. 5 show an FT-IR analysis result of formation of a functional group by a hydrogen plasma treatment and a hydrogen and nitrogen plasma treatment according to an example embodiment of the present disclosure.

Referring to FIG. 5, a functional group is formed on a surface of a nanodiamond by a plasma treatment. The functional group may be an amino group (—NH$_2$), a carboxyl group (—COOH) or a methylene group (—CH$_2$). The functional group may promote a bonding force between the nanodiamond and the polymer composite (PTFE).

In the case of a plasma-untreated nanodiamond (Comparative Example 1), a functional group was not found in the FT-IR analysis.

In the case of a hydrogen plasma-treated nanodiamond (Exemplary Embodiment 1), it was observed that wavenumber was changed to a peak associated with a CH (SP$^3$) bond near 2980 cm$^{-1}$. It is interpreted that as hydrogen that decomposes a carbon bond, a plasma breaks amorphous carbon, i.e., SP$^2$ bond having weaker energy than SP$^3$, which is a carbon crystal structure, to remove unnecessary amorphous carbons remaining on a surface.

In the case that a hydrogen gas and a nitrogen gas are mixed at a flow rate of one-to-one (1:1) to generate a plasma and the commercially available diamond powder is exposed to the plasma (Exemplary Embodiment 2), a peak corresponding to an amino group (—NH$_2$) was found. Due to the chemical bond, improved mechanical properties may be provided various types of mechanical components. More specifically, the functional group may be used as a coating of a contact portion of a mechanical component and a rotation component which require a high durability.

Accordingly, the hydrogen plasma treatment or a hydrogen-nitrogen mixture gas plasma treatment grind a commercially available powder, forms a functional group on a surface of the nanodiamond, and remove amorphous carbon.

Exemplary Embodiment 1 confirmed that the CH (SP$^3$) bond is formed by a hydrogen gas, and Exemplary Embodiment 2 shows the result that an N—H bond may be formed by hydrogen and nitrogen. As a result, this refers to the fact that various functional groups may be bonded by changing a plasma generation gas. In addition, these functional groups may promote a bonding force with a polymer matrix to improve mechanical characteristics.

Figure 6:
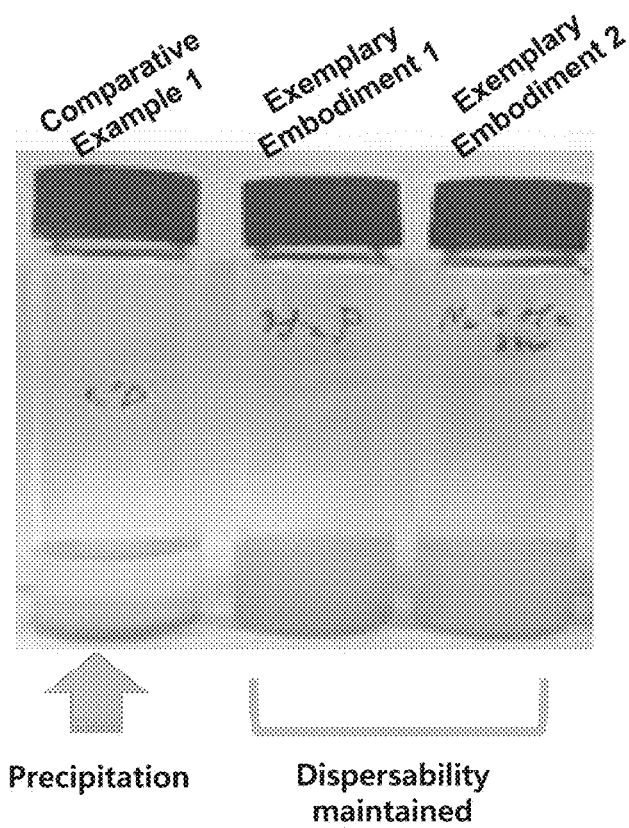
FIG. 6 is an image showing dispersion characteristics before and after a plasma treatment using a hydrogen gas or a mixture gas of hydrogen and nitrogen according to an example embodiment of the present disclosure.

FIG. 6 is an image showing dispersion characteristics before and after a plasma treatment using a hydrogen gas or a mixture gas of hydrogen and nitrogen according to an example embodiment of the present disclosure.

Referring to FIG. 6, the image shows a result when a nanodiamond before and after a plasma treatment was charged into ethanol and left for four weeks or more.

It could be confirmed that the nanodiamond before the plasma treatment precipitated in an ethanol solution after being left for a long period of time (Comparative Example 1).

Dispersability could be confirmed because the hydrogen plasma-treated nanodiamond did not precipitate in an ethanol solution after being left for a long period of time (Exemplary Embodiment 1).

Dispersability could be confirmed because the hydrogen and nitrogen plasma-treated nanodiamond did not precipitate in an ethanol solution after being left for a long period of time (Exemplary Embodiment 2).

It was confirmed that the plasma-untreated nanodiamond of Comparative Example 1 precipitated after being left for four weeks or more, while it could be confirmed that the plasma-treated nanodiamonds of Exemplary Embodiments 1 and 2 are floating well in their original states. Accordingly, it may be seen that dispersability is considerably improved. As a result, it may be expected that high-quality polymer composite coating may be formed because it is uniformly dispersed when being added to a polymer composite.

Figure 7A:
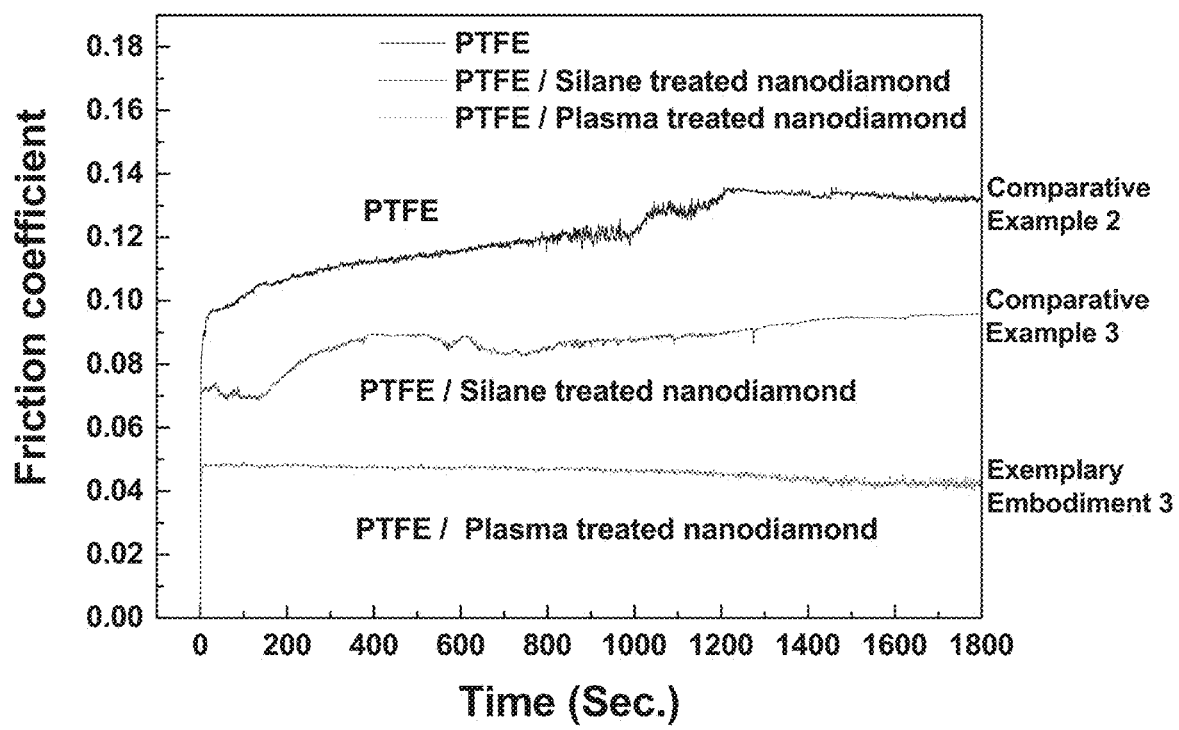
FIG. 7A shows a friction test under a first condition depending on time of a PTFE coating according to an example embodiment of the present disclosure.

FIG. 7A shows a friction test under a first condition depending on time of a PTFE coating according to an example embodiment of the present disclosure.

Figure 7B:
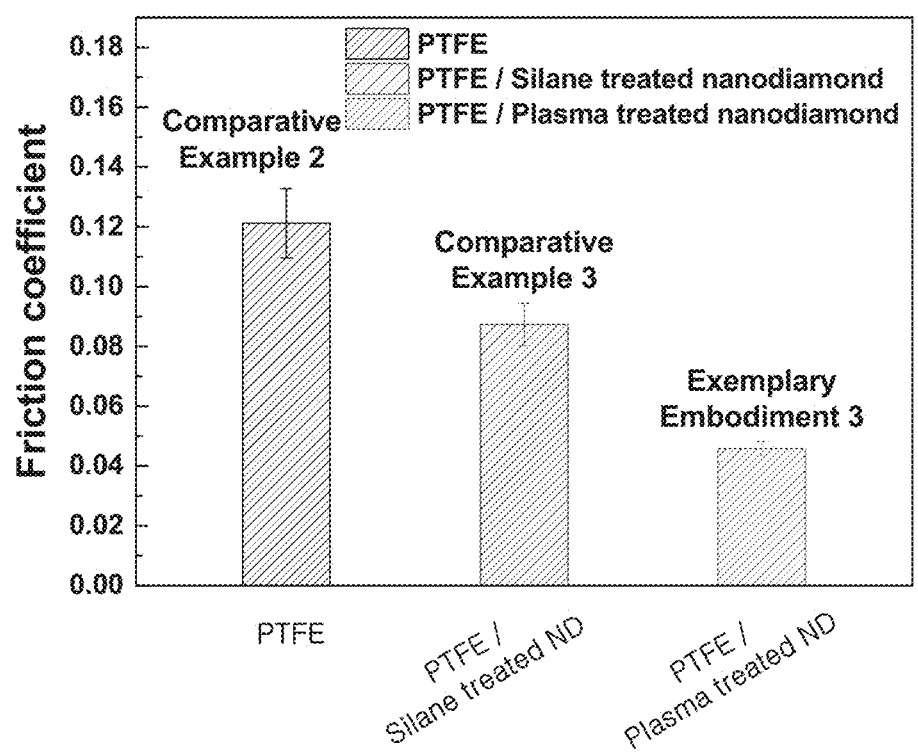
FIG. 7B shows an average friction coefficient under the first condition depending on time of the PTFE coating according to an example embodiment of the present disclosure.

FIG. 7B shows an average friction coefficient under the first condition depending on time of the PTFE coating according to an example embodiment of the present disclosure.

Figure 7C:
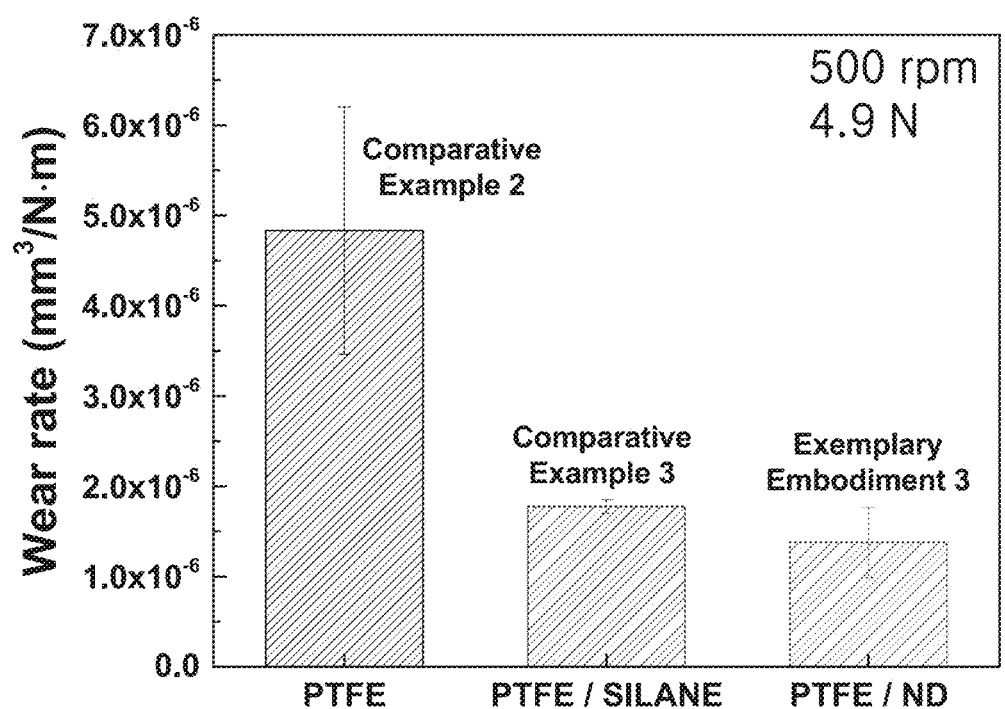
FIG. 7C shows wear-resistant characteristics under the first condition according to an example embodiment of the present disclosure.

FIG. 7C shows wear-resistant characteristics under the first condition according to an example embodiment of the present disclosure.

Referring to FIGS. 7A and 7B, the first test condition is a result of comparing friction characteristics (friction coefficients) measured at a force of 4.9 N applied and a rotation speed of 500 rpm for 30 minutes.

Comparative Example 2 is a result of checking a friction coefficient of a PTFE coating surface to which a nanodiamond is not added, and a friction coefficient of about 0.12 was measured.

In the case of Comparative Example 3, a PTFE-nanodiamond composite to which a nanodiamond applying a silane coupling agent is added was coated to disperse a typical nanodiamond. In this case, a friction coefficient measured is about 0.087. The friction coefficient of Comparative Example 3 was more reduced than that of Comparative Example 2.

According to example embodiments of the present disclosure, in the case of Exemplary Embodiment 3, a PTFE-nanodiamond composite to which a plasma-treated nanodiamond is added was coated. In this case, a friction coefficient measured was about 0.046. When a nanodiamond is treated with a plasma to produce PTFE and polymer composite, friction characteristics were significantly improved.

Referring to FIG. 7C, wear amount was measured under the first condition (a force of 4.9 N is applied and a rotation speed is 500 rpm). In the case of Comparative Example 2 (PTFE coating to which a nanodiamond is not added), the wear amount measured was about 4.83×10$^{-6}$ (mm$^3$/Nm).

In the case of Comparative Example 3 (PTFE-nanodiamond composite coating to which a nanodiamond applying a silane coupling agent is added), a PTFE-nanodiamond polymer composite to which a nanodiamond applying a silane coupling agent for dispersion a typical nanodiamond was coated to measure the wear amount. The wear amount measured was about 1.77×10$^{-6}$ (mm$^3$/Nm). Accordingly, it was confirmed that wear resistance was more improved in Comparative Example 3 than in Comparative Example 2.

According to example embodiments of the present disclosure, in the case of PTFE applying a plasma-treated nanodiamond of Exemplary embodiment 3 (PTFE-nanodiamond composite coating to which a plasma-treated nanodiamond is added), the wear amount was 경우 1.37×10$^{-6}$ (mm$^3$/Nm). Accordingly, it could be confirmed that wear resistance was improved when the nanodiamond is treated with plasma to form PTFE and polymer composite.

Figure 8A:
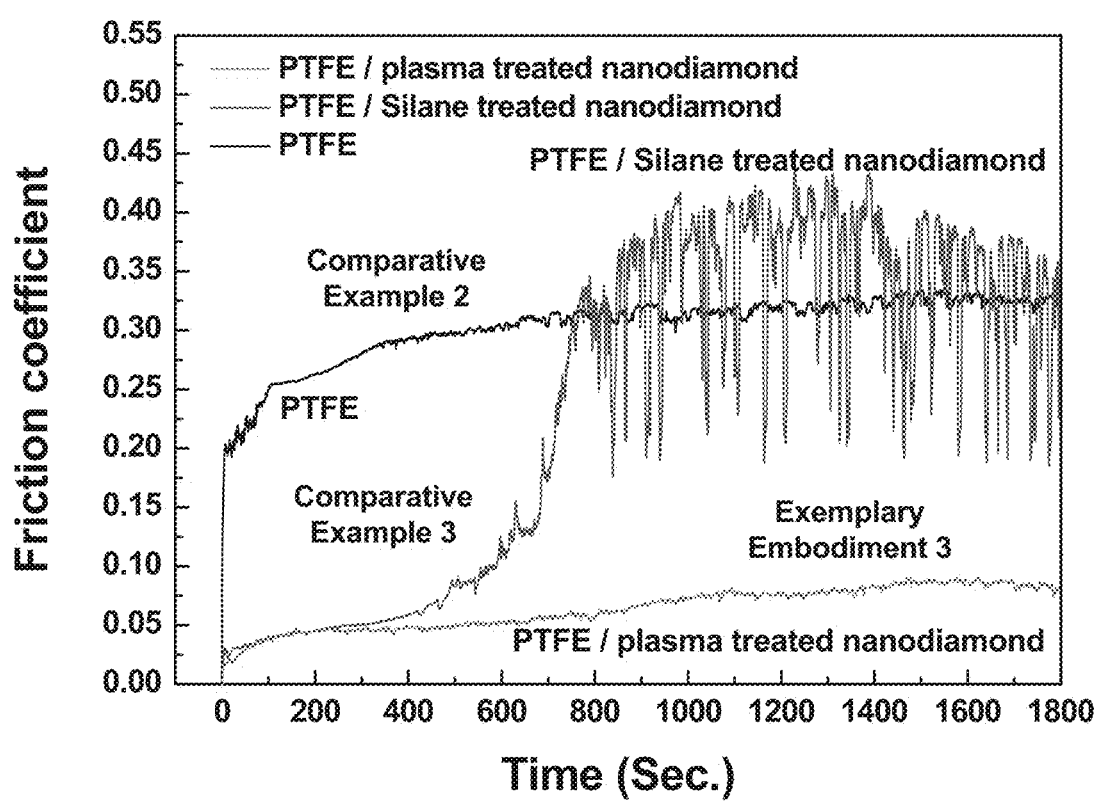
FIG. 8A shows a friction test under a second condition depending on time of a PTFE coating according to an example embodiment of the present disclosure.

FIG. 8A shows a friction test under a second condition depending on time of a PTFE coating according to an example embodiment of the present disclosure.

Figure 8B:
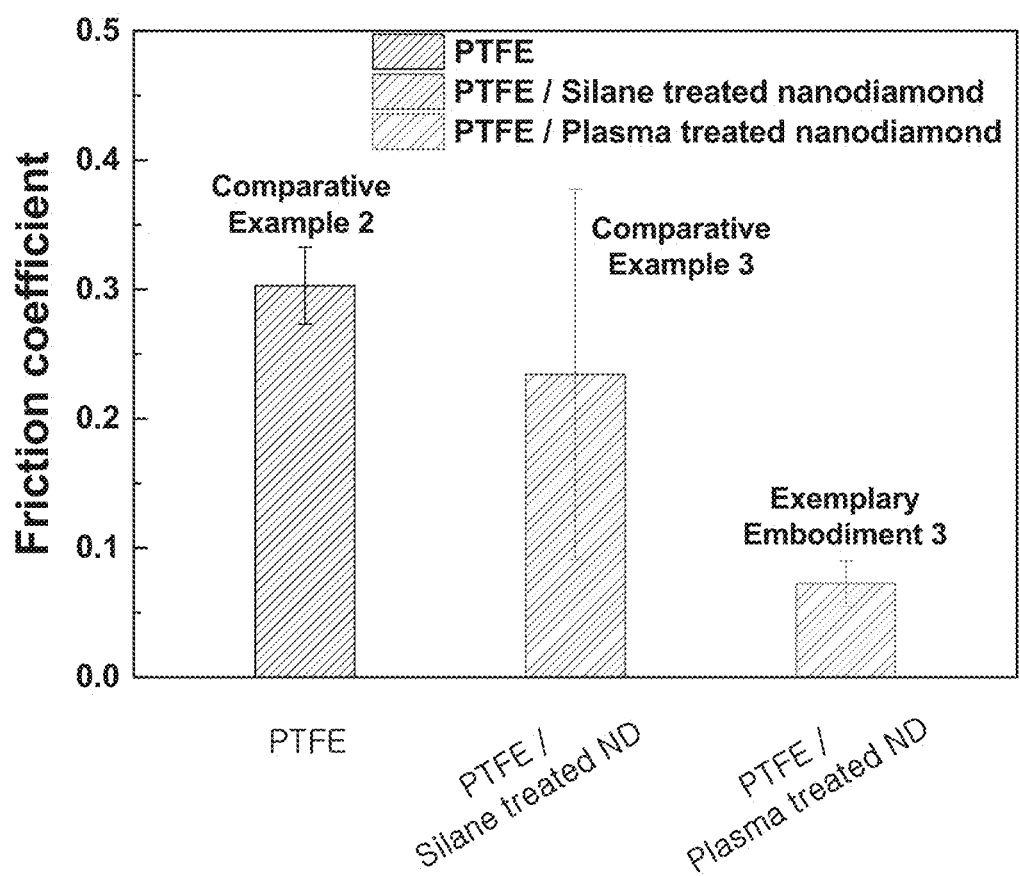
FIG. 8B shows an average friction coefficient under the second condition depending on time of the PTFE coating according to an example embodiment of the present disclosure.

FIG. 8B shows an average friction coefficient under the second condition depending on time of the PTFE coating according to an example embodiment of the present disclosure.

Figure 8C:
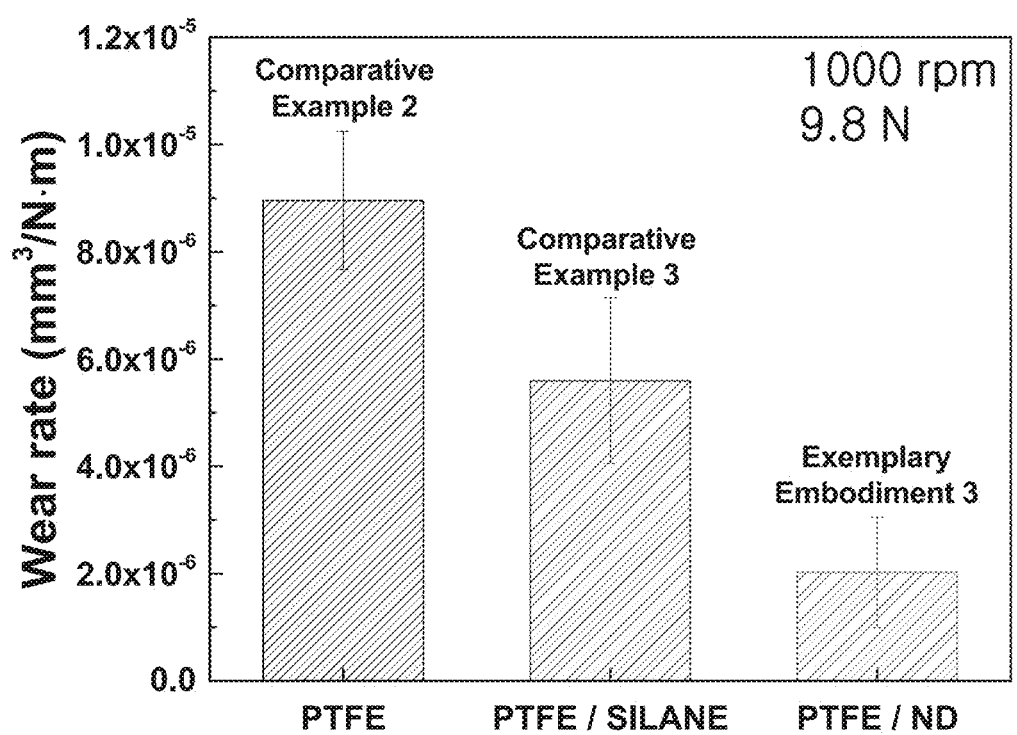
FIG. 8C shows wear-resistant characteristics under the second condition according to an example embodiment of the present disclosure.

FIG. 8C shows wear-resistant characteristics under the second condition according to an example embodiment of the present disclosure.

Referring to FIGS. 8A and 8B, a test condition was more severe. The second condition was that a force applied was 9.8 N and a rotation speed was 1000 rpm. The result is the friction characteristics measured under the second condition for 30 minutes.

In the case of Comparative Example 2 (PTFE coating to which a nanodiamond is not added), a friction coefficient of about 0.3 was measured.

In the case of Comparative Example 3 (PTFE-nanodiamond composite coating to which a silane coupling agent is not applied), a friction coefficient of about 0.23 was measured. It was confirmed that a friction coefficient was more reduced in Comparative Example 3 than in Comparative Example 2. A time-dependent friction behavior was checked. In the case of a nanodiamond-PTFE composite to which a silane coupling agent is applied, the friction coefficient rapidly increases after 400 seconds pass and the nanodiamond-PTFE composite exhibits the same friction behavior as PTFE. This seems to mean that a typical silanized nanodiamond-PTFE composite lost its functions under severe friction test conditions.

According to example embodiments of the present disclosure, in the case of Exemplary Embodiment 3 (PTFE-nanodiamond composite coating to which a plasma-treated nanodiamond is added), a time-dependent friction behavior was stable and a friction coefficient was 0.07. Accordingly, it could be seen that the friction characteristics are significantly improved when the nanodiamond is treated with a plasma to form PTFE and polymer composite.

Referring to FIG. 8C, wear amount was measured under the second condition (a force of 9.8 N is applied and a rotation speed is 1000 rpm). In the case of Comparative Example 2 (PTFE coating to which a nanodiamond is not added), wear amount measured was about $8.95 \times 10^{-6}$ (mm$^3$/Nm).

In the case of Comparative Example 3 (PTFE-nanodiamond composite coating to which a nanodiamond applying a silane coupling agent is added), wear amount was about $5.59 \times 10^{-6}$ (mm$^3$/Nm). It was conformed that wear resistance was more improved in Comparative Example 3 than in Comparative Example 2.

However, in the case of Exemplary Embodiment 3 (PTFE-nanodiamond composite coating to which a plasma-treated nanodiamond is added), wear amount was $2.02 \times 10^{-6}$ (mm$^3$/Nm). Accordingly, it could be seen that the wear resistance is significantly improved when the nanodiamond is treated with a plasma to form PTFE and polymer composite.

When a functional group is formed on a particle surface of a plasma-treated nanodiamond and a composite is formed together with a polymer by removing unnecessary amorphous carbon on the surface, excellent performances of the nanodiamond may all be used. In addition, a plasma treatment process is applied to simplify processes, i.e., a milling process of grinding particles and processes such as ultrasonic treatment and addition of a disperser need not be performed. Thus, producing time and cost are dramatically reduced and dispersability of the nanodiamond is improved. As a result, it is preferable to apply a plasma process to a wear-resistant and low-friction polymer composite coating.

Furthermore, another aspect of the present disclosure is that nanodiamond dispersion processes may be significantly reduced through a plasma treatment procedure to reduce producing unit cost. Since the producing method is performed at the same time as exposure to a plasma, high-quality nanodiamond powder may be produced without conventional complex processes. Moreover, as described above, the composite is expected to be used as a surface hard film in a rotation component of an automobile component or a contact portion of a mechanical component which requires high quality such as excellent wear resistance and low friction coefficient achieved by improvement in dispersability of a nanodiamond and surface treatment.

As described above, according to example embodiments of the present disclosure, dispersability of nanodiamonds may be improved by a hydrogen plasma treatment, a functional group may be attached to the nanodiamond, a particle size of the nanodiamond may be controlled, and wear performance of a coating in which the nanodiamond is mixed may be improved.

According to example embodiments of the present disclosure, dispersability may be effectively improved by treating a commercially available powder with a plasma. In addition, a hydrogen plasma treatment may grind aggregated nanodiamond particles to control a particle size.

According to example embodiments of the present disclosure, a hydrogen plasma treatment of a commercially available diamond powder forms a chemical on its surface to improve adhesion to a polymer composite. Thus, mechanical characteristics (more specifically, wear-resistant and low-friction characteristics) of a polymer coating may be provided.

According to example embodiments of the present disclosure, amorphous carbon formed on a surface of a commercially available nanodiamond is removed to obtain excellent characteristics of a pure nanodiamond. With the excellent characteristics of the pure nanodiamond, a nanodiamond may be more effectively used than in a conventional nanodiamond dispersion treatment.

The above-mentioned effects may occur simultaneously when a nanodiamond is exposed to a plasma and may dramatically reduce producing processes. In addition, when a nanodiamond is exposed to a plasma to form a functional group, adhesion and bonding force with a polymer may be improved to improve wear-resistant and friction characteristics.

As a result, a nanodiamond produced by a method of the present disclosure may be applied to various fields such as coating of a polymer material or coating of a carbon-based material and, in particular, is suitable to coating of mechanical components such as a sliding component, a piston ring and a compressor vane which require excellent mechanical characteristics.

Although the present disclosure and its advantages have been described in detail, it should be understood that various changes, substitutions and alterations can be made herein without departing and scope of the disclosure as defined by the following claims.

What is claimed is:

1. A preparing method of a polytetrafluoroethylene (PTFE) coating, comprising:
   treating a diamond powder having a particle size of several micrometers (µm) with a plasma using a mixture of hydrogen gas ($H_2$) and nitrogen gas ($N_2$) to grind the diamond powder to a nanodiamond powder to provide for a plasma-treated nanodiamond powder, to remove amorphous carbon on a surface of the plasma-treated nanodiamond powder, and to attach a functional group to the surface of the plasma-treated nanodiamond powder; and mixing the plasma-treated nanodiamond powder having a functional group with a PTFE solution.

2. The preparing method as set forth in claim 1, wherein the treating the commercially available diamond powder with the plasma comprises:

disposing the commercially available diamond powder on a plasma treatment apparatus comprising a crucible disposed in a vacuum container; and maintaining a temperature of an inside of the crucible between 300 and 700 degrees Celsius during the treating.

3. The preparing method as set forth in claim 1, wherein;

a particle size of the plasma-treated nanodiamond is between 190 and 220 nanometers (nm).

4. The preparing method as set forth in claim 2, wherein;

the plasma treatment apparatus includes a top electrode and a bottom electrode disposed to face each other, and wherein the treating the commercially available diamond powder with the plasma comprises:

placing the commercially available diamond powder on the crucible disposed on the bottom electrode;

supplying the mixture of hydrogen gas ($H_2$) and nitrogen gas ($N_2$) through a gas inlet disposed on the top electrode;

emitting and distributing the mixture of hydrogen gas ($H_2$) and nitrogen gas ($N_2$) into the crucible after heating the crucible; and providing RF power to generate capacitively-coupled hydrogen plasma.

5. The preparing method as set forth in claim 4, wherein a pressure of the vacuum container is between 50 to 1000 milliTorr (mTorr), and wherein the RF power is between 200 and 1000 watts (W).

6. The preparing method as set forth in claim 4, wherein a size of the diamond powder is 4 micrometers.

7. A preparing method of a polytetrafluoroethylene (PTFE) coating, comprising:

treating a diamond powder having a particle size of several micrometers (μm) with a plasma using a hydrogen gas to grind the diamond powder to a nanodiamond powder to provide for a plasma-treated nanodiamond powder, to remove amorphous carbon on a surface of the plasma-treated nanodiamond powder, and to attach a functional group to the surface of the plasma-treated nanodiamond powder; and mixing the plasma-treated nanodiamond powder having a functional group with a PTFE solution, wherein the particle size of the diamond powder is 4 micrometers and a particle size of the plasma-treated nanodiamond powder is between 190 nm and 220 nanometers.

8. The preparing method as set forth in claim 7, wherein the treating the diamond powder with the plasma comprises:

disposing the diamond powder on a plasma treatment apparatus comprising a crucible disposed in a vacuum container; and maintaining a temperature of an inside of the crucible between 300 and 700 degrees Celsius during the treating.

9. The preparing method as set forth in claim 8, wherein the plasma treatment apparatus includes a top electrode and a bottom electrode disposed to face each other, and wherein the treating the diamond powder with the plasma comprises:

placing the diamond powder on the crucible disposed on the bottom electrode;

supplying the hydrogen gas through a gas inlet disposed on the top electrode;

emitting and distributing the mixture of hydrogen gas ($H_2$) and nitrogen gas ($N_2$) into the crucible after heating the crucible; and providing RF power to generate a capacitively-coupled hydrogen plasma.

10. The preparing method as set forth in claim 9, wherein a pressure of the vacuum container is between 50 to 1000 milliTorr (mTorr), and wherein the RF power is between 200 and 1000 watts (W).

11. The preparing method as set forth in claim 1, wherein the functional group is an amino group (—$NH_2$).

* * * * *